US012639515B2

(12) United States Patent
Hwang

(10) Patent No.: US 12,639,515 B2
(45) Date of Patent: May 26, 2026

(54) ELECTRONIC APPARATUS RECOMMENDING CONTENT-BASED SEARCH TERMS AND CONTROL METHOD THEREOF

(71) Applicant: SAMSUNG ELECTRONICS CO., LTD., Suwon-si (KR)

(72) Inventor: Hyungwon Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 303 days.

(21) Appl. No.: 18/102,483

(22) Filed: Jan. 27, 2023

(65) Prior Publication Data

US 2023/0177265 A1     Jun. 8, 2023

Related U.S. Application Data

(63) Continuation of application No. PCT/KR2021/007114, filed on Jun. 8, 2021.

(30) Foreign Application Priority Data

Jul. 29, 2020    (KR) ........................ 10-2020-0094768

(51) Int. Cl.
*G06F 40/274*      (2020.01)
*G06F 16/3332*      (2025.01)
            (Continued)

(52) U.S. Cl.
CPC ........ *G06F 40/274* (2020.01); *G06F 16/3334* (2019.01); *G06F 40/279* (2020.01); *H04N 21/4828* (2013.01)

(58) Field of Classification Search
CPC .. G06F 40/274; G06F 16/3334; G06F 40/279; G06F 16/9535; G06F 40/268;
            (Continued)

(56) References Cited

U.S. PATENT DOCUMENTS 8,713,042 B1 *   4/2014   Zinenko ............ G06F 16/90328
                                                    707/765
8,732,187 B1 *   5/2014   Jing .................... G06F 16/9535
                                                    707/765
            (Continued)

FOREIGN PATENT DOCUMENTS

CN          105095432 B      4/2019
JP          2006-48657 A      2/2006
            (Continued)

OTHER PUBLICATIONS

International Search Report (PCT/ISA210) issued Sep. 9, 2021 by the International Searching Authority in International Patent Application No. PCT/KR2021/007114.
            (Continued)

*Primary Examiner* — Darioush Agahi
(74) *Attorney, Agent, or Firm* — Sughrue Mion, PLLC

(57)            ABSTRACT

An electronic apparatus includes a display and a processor connected with the display, and configured to control the display. The processor is configured to control the display to display content and obtain a text corpus associated with the displayed content. The processor is further configured to obtain, based on a letter for a search being input while the content is displayed and based on the obtained text corpus, at least one completion text which comprises the input letter based on the obtained text corpus. The processor is further configured to control the display to display the obtained completion text as a recommended search term.

14 Claims, 18 Drawing Sheets

(51) Int. Cl.
G06F 40/279 (2020.01)
H04N 21/482 (2011.01)

(58) Field of Classification Search
CPC ............. G06F 40/284; G06F 16/90324; G06F 16/9038; H04N 21/4828
See application file for complete search history.

(56) References Cited

U.S. PATENT DOCUMENTS

| | | | |
|---|---|---|---|
| 9,626,429 | B2 | 4/2017 | Unruh |
| 9,652,556 | B2 | 5/2017 | Whitelaw et al. |
| 9,715,496 | B1* | 7/2017 | Sapoznik ................ H04L 51/02 |
| 10,091,560 | B2 | 10/2018 | Oh et al. |
| 10,817,586 | B2 | 10/2020 | Wang et al. |
| 11,012,754 | B2 | 5/2021 | Oh et al. |
| 11,200,295 | B2 | 12/2021 | Wang et al. |
| 11,281,724 | B2 | 3/2022 | Song et al. |
| 2009/0113476 | A1* | 4/2009 | Vogel ................. H04N 7/17318 |
| | | | 725/39 |
| 2009/0248484 | A1 | 10/2009 | Surendran et al. |
| 2010/0064030 | A1 | 3/2010 | Miura |
| 2011/0125847 | A1* | 5/2011 | Cocheu ............. G06Q 30/0241 |
| | | | 709/204 |
| 2012/0117101 | A1* | 5/2012 | Unruh ................... G06F 40/274 |
| | | | 707/765 |
| 2012/0123978 | A1* | 5/2012 | Toderice ................ G06V 20/70 |
| | | | 706/12 |
| 2013/0050089 | A1* | 2/2013 | Neels ................... G06F 3/0237 |
| | | | 345/168 |
| 2013/0282703 | A1* | 10/2013 | Puterman-Sobe ...... H04L 67/51 |
| | | | 707/E17.084 |
| 2014/0012568 | A1 | 1/2014 | Caskey et al. |
| 2015/0046434 | A1* | 2/2015 | Lim ................... G06F 16/9535 |
| | | | 707/722 |
| 2015/0365722 | A1* | 12/2015 | Oztaskent ............. G06F 16/433 |
| | | | 725/18 |
| 2016/0188639 | A1 | 6/2016 | Levy |
| 2016/0295291 | A1 | 10/2016 | Oh et al. |
| 2018/0067954 | A1 | 3/2018 | Wang et al. |
| 2018/0081875 | A1 | 3/2018 | Le et al. |
| 2018/0300021 | A1* | 10/2018 | Montaldi ........... G06F 3/04886 |
| 2019/0014384 | A1 | 1/2019 | Oh et al. |
| 2019/0114131 | A1* | 4/2019 | Wygonik ............. G06F 3/1423 |
| 2019/0114478 | A1* | 4/2019 | Xi ....................... G06F 3/04883 |
| 2019/0251125 | A1 | 8/2019 | Song et al. |
| 2020/0411150 | A1* | 12/2020 | Saalbach ............... G06N 20/00 |
| 2021/0004419 | A1 | 1/2021 | Wang et al. |

FOREIGN PATENT DOCUMENTS

| | | | |
|---|---|---|---|
| KR | 10-2004-0107019 | A | 12/2004 |
| KR | 10-2008-0028655 | A | 4/2008 |
| KR | 10-1082801 | B1 | 11/2011 |
| KR | 10-1092356 | B1 | 12/2011 |
| KR | 10-2013-0108619 | A | 10/2013 |
| KR | 10-1414492 | B1 | 7/2014 |
| KR | 10-2015-0017156 | A | 2/2015 |
| KR | 10-2018-0031291 | A | 3/2018 |
| KR | 10-1916798 | B1 | 11/2018 |
| KR | 10-2020-0028918 | A | 1/2020 |

OTHER PUBLICATIONS

Written Opinion (PCT/ISA237) issued Sep. 9, 2021 by the International Searching Authority in International Patent Application No. PCT/KR2021/007114.

Communication dated Nov. 5, 2025 issued by the Korean Ministry of Intellectual Property in counterpart Korean Patent Application No. 10-2020-0094768.

* cited by examiner

Figure 4A:
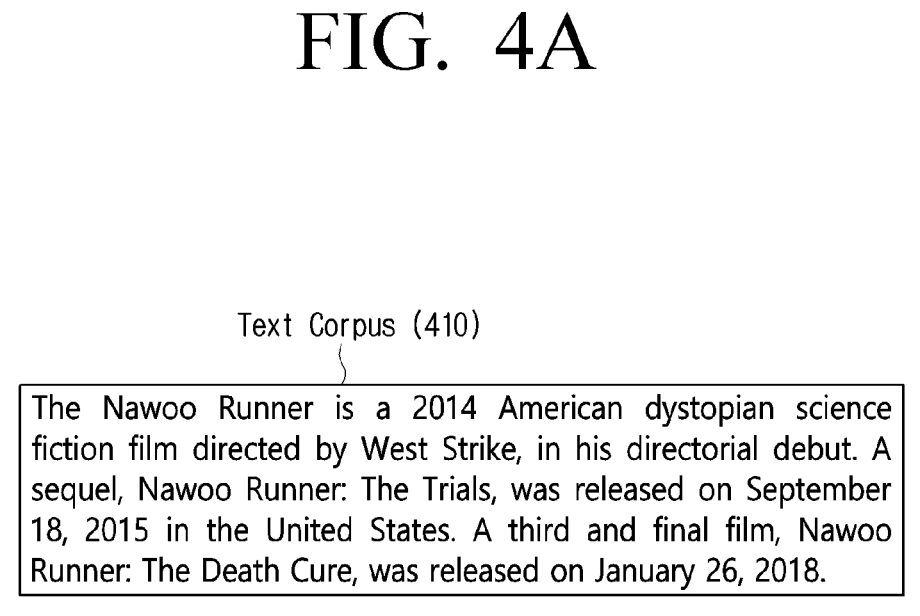

Text Corpus (410)

The Nawoo Runner is a 2014 American dystopian science fiction film directed by West Strike, in his directorial debut. A sequel, Nawoo Runner: The Trials, was released on September 18, 2015 in the United States. A third and final film, Nawoo Runner: The Death Cure, was released on January 26, 2018.

FIG. 4B

| TAGS | PART OF SPEECH INFORMATION |
|------|----------------------------|
| CC | COORDINATING CONJUNCTION |
| CD | CARDINAL NUMBER |
| DT | DETERMINER |
| FW | FOREIGN WORD |
| IN | PREPOSITION |
| JJ | ADJECTIVE |
| ... | ... |
| NN | NOUN (SINGULAR OR MASS) |
| NNS | NOUN (PLURAL) |
| NNP | PROPER NOUN (SINGULAR) |
| NNPS | PROPER NOUN (PLURAL) |
| ... | ... |
| VB | VERB (BASE FORM) |
| VBD | VERB (PAST TENSE) |
| VBN | VERB (PAST PARTICLE) |
| ... | ... |
| SYM | SYMBOL |

FIG. 4C 411  411-1  412  412-1    Tagged Text Corpus (410')

Figure 4C:
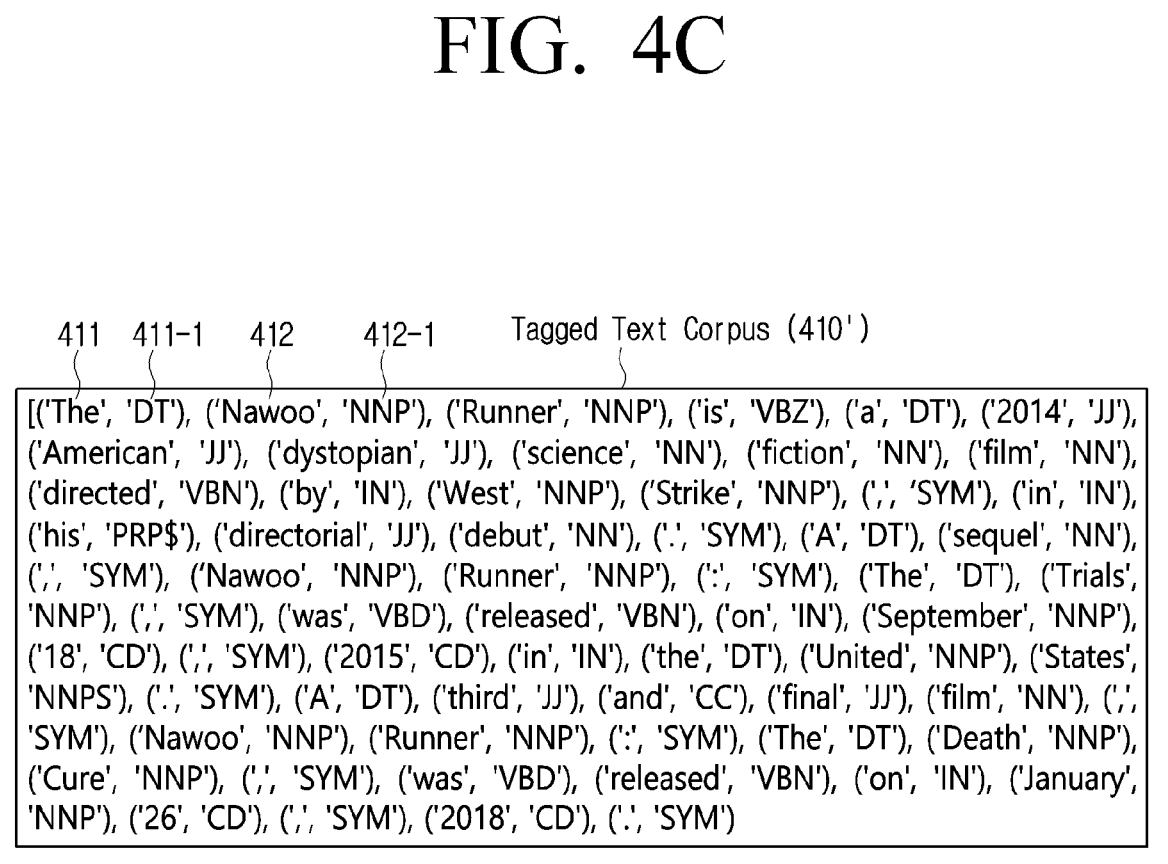

[('The', 'DT'), ('Nawoo', 'NNP'), ('Runner', 'NNP'), ('is', 'VBZ'), ('a', 'DT'), ('2014', 'JJ'), ('American', 'JJ'), ('dystopian', 'JJ'), ('science', 'NN'), ('fiction', 'NN'), ('film', 'NN'), ('directed', 'VBN'), ('by', 'IN'), ('West', 'NNP'), ('Strike', 'NNP'), (',', 'SYM'), ('in', 'IN'), ('his', 'PRP$'), ('directorial', 'JJ'), ('debut', 'NN'), ('.', 'SYM'), ('A', 'DT'), ('sequel', 'NN'), (',', 'SYM'), ('Nawoo', 'NNP'), ('Runner', 'NNP'), (':', 'SYM'), ('The', 'DT'), ('Trials', 'NNP'), (',', 'SYM'), ('was', 'VBD'), ('released', 'VBN'), ('on', 'IN'), ('September', 'NNP'), ('18', 'CD'), (',', 'SYM'), ('2015', 'CD'), ('in', 'IN'), ('the', 'DT'), ('United', 'NNP'), ('States', 'NNPS'), ('.', 'SYM'), ('A', 'DT'), ('third', 'JJ'), ('and', 'CC'), ('final', 'JJ'), ('film', 'NN'), (',', 'SYM'), ('Nawoo', 'NNP'), ('Runner', 'NNP'), (':', 'SYM'), ('The', 'DT'), ('Death', 'NNP'), ('Cure', 'NNP'), (',', 'SYM'), ('was', 'VBD'), ('released', 'VBN'), ('on', 'IN'), ('January', 'NNP'), ('26', 'CD'), (',', 'SYM'), ('2018', 'CD'), ('.', 'SYM')]

FIG. 4D 411　411-1 411-2　412　　412-1 412-2　　　Tagged Text Corpus (410'')

Figure 4D:
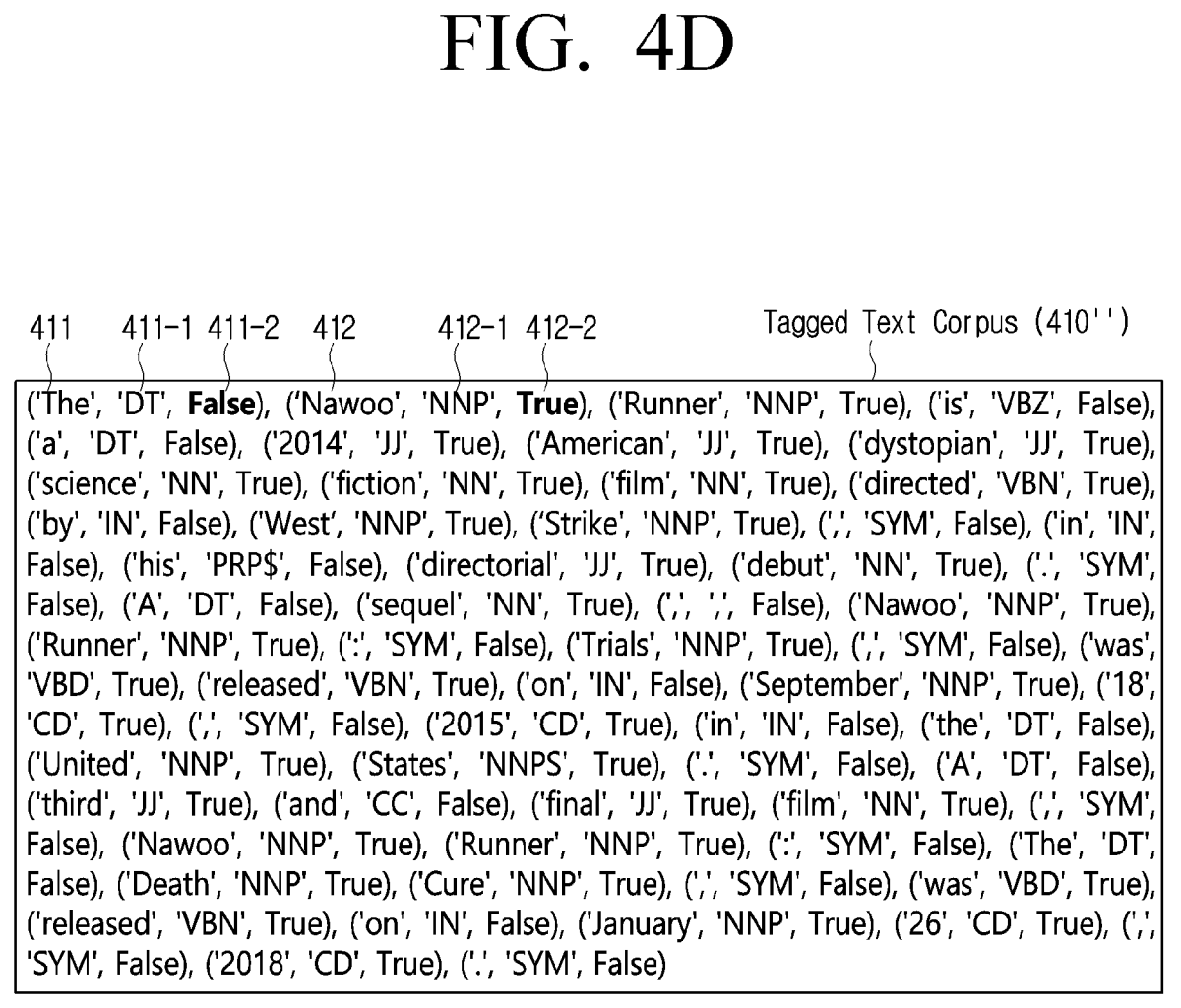

('The', 'DT', False), ('Nawoo', 'NNP', True), ('Runner', 'NNP', True), ('is', 'VBZ', False), ('a', 'DT', False), ('2014', 'JJ', True), ('American', 'JJ', True), ('dystopian', 'JJ', True), ('science', 'NN', True), ('fiction', 'NN', True), ('film', 'NN', True), ('directed', 'VBN', True), ('by', 'IN', False), ('West', 'NNP', True), ('Strike', 'NNP', True), (',', 'SYM', False), ('in', 'IN', False), ('his', 'PRP$', False), ('directorial', 'JJ', True), ('debut', 'NN', True), ('.', 'SYM', False), ('A', 'DT', False), ('sequel', 'NN', True), (',', ',', False), ('Nawoo', 'NNP', True), ('Runner', 'NNP', True), (':', 'SYM', False), ('Trials', 'NNP', True), (',', 'SYM', False), ('was', 'VBD', True), ('released', 'VBN', True), ('on', 'IN', False), ('September', 'NNP', True), ('18', 'CD', True), (',', 'SYM', False), ('2015', 'CD', True), ('in', 'IN', False), ('the', 'DT', False), ('United', 'NNP', True), ('States', 'NNPS', True), ('.', 'SYM', False), ('A', 'DT', False), ('third', 'JJ', True), ('and', 'CC', False), ('final', 'JJ', True), ('film', 'NN', True), (',', 'SYM', False), ('Nawoo', 'NNP', True), ('Runner', 'NNP', True), (':', 'SYM', False), ('The', 'DT', False), ('Death', 'NNP', True), ('Cure', 'NNP', True), (',', 'SYM', False), ('was', 'VBD', True), ('released', 'VBN', True), ('on', 'IN', False), ('January', 'NNP', True), ('26', 'CD', True), (',', 'SYM', False), ('2018', 'CD', True), ('.', 'SYM', False)

FIG. 6

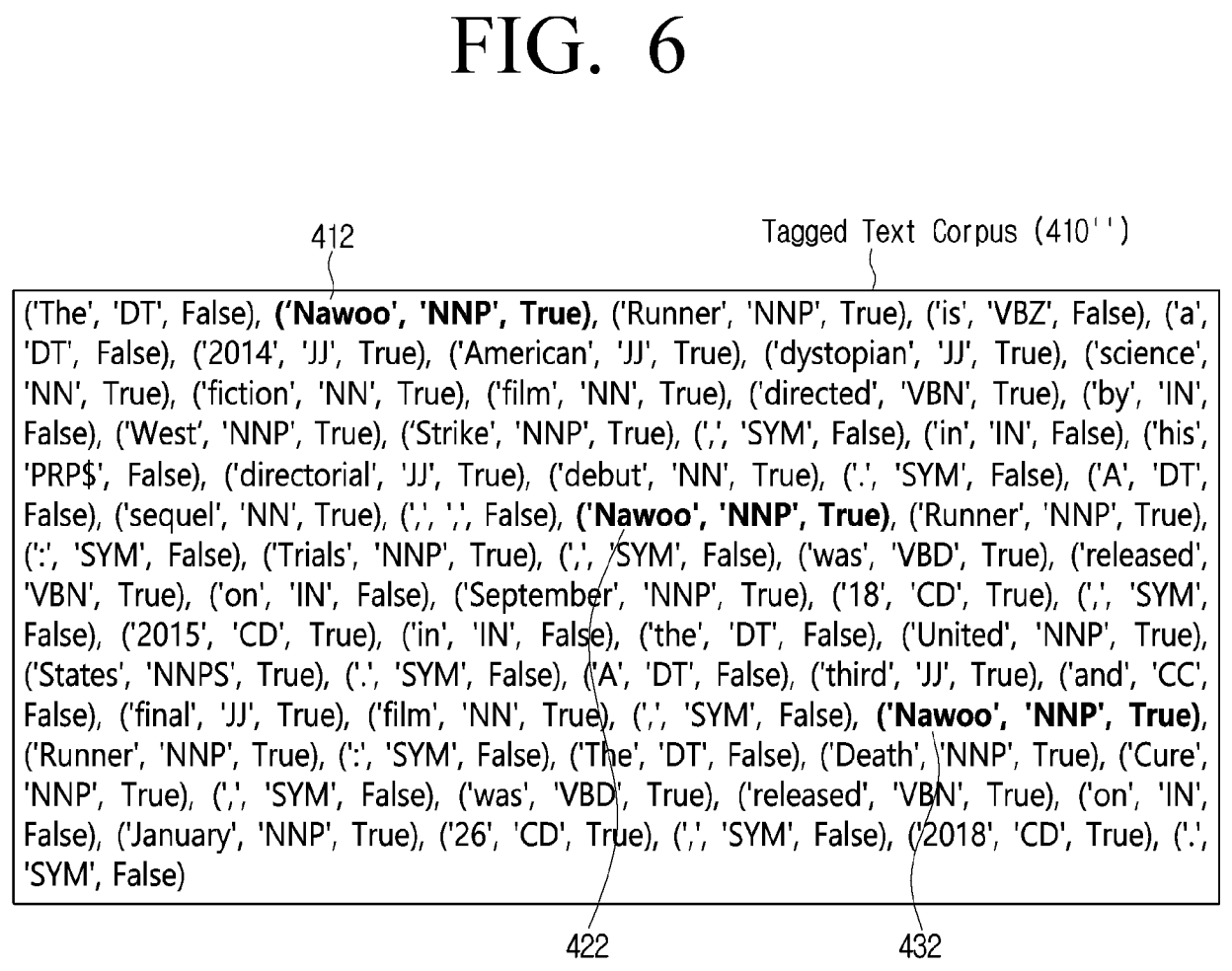

Tagged Text Corpus (410'')

412

('The', 'DT', False), ('Nawoo', 'NNP', True), ('Runner', 'NNP', True), ('is', 'VBZ', False), ('a', 'DT', False), ('2014', 'JJ', True), ('American', 'JJ', True), ('dystopian', 'JJ', True), ('science', 'NN', True), ('fiction', 'NN', True), ('film', 'NN', True), ('directed', 'VBN', True), ('by', 'IN', False), ('West', 'NNP', True), ('Strike', 'NNP', True), (':', 'SYM', False), ('in', 'IN', False), ('his', 'PRP$', False), ('directorial', 'JJ', True), ('debut', 'NN', True), (':', 'SYM', False), ('A', 'DT', False), ('sequel', 'NN', True), (',', ',', False), ('Nawoo', 'NNP', True), ('Runner', 'NNP', True), (':', 'SYM', False), ('Trials', 'NNP', True), (':', 'SYM', False), ('was', 'VBD', True), ('released', 'VBN', True), ('on', 'IN', False), ('September', 'NNP', True), ('18', 'CD', True), (',', 'SYM', False), ('2015', 'CD', True), ('in', 'IN', False), ('the', 'DT', False), ('United', 'NNP', True), ('States', 'NNPS', True), (':', 'SYM', False), ('A', 'DT', False), ('third', 'JJ', True), ('and', 'CC', False), ('final', 'JJ', True), ('film', 'NN', True), (',', 'SYM', False), ('Nawoo', 'NNP', True), ('Runner', 'NNP', True), (':', 'SYM', False), ('The', 'DT', False), ('Death', 'NNP', True), ('Cure', 'NNP', True), ('was', 'VBD', True), ('released', 'VBN', True), ('on', 'IN', False), ('January', 'NNP', True), ('26', 'CD', True), (',', 'SYM', False), ('2018', 'CD', True), (':', 'SYM', False)

| 110 — | DISPLAY | | PROCESSOR |
|---|---|---|---|

<u>1000</u>

ELECTRONIC APPARATUS RECOMMENDING CONTENT-BASED SEARCH TERMS AND CONTROL METHOD THEREOF

CROSS-REFERENCE TO RELATED APPLICATIONS

This application is a by-pass continuation application of International Application No. PCT/KR2021/007114, filed on Jun. 8, 2021, which claims priority to Korean Patent Application No. 10-2020-0094768, filed on Jul. 29, 2020, in the Korean Intellectual Property Office, the disclosures of which are incorporated by reference herein in their entireties.

BACKGROUND

1. Field

The disclosure relates to an electronic apparatus, which provides an automatic completing function of a recommended search term that includes an input letter for a search. More particularly, the disclosure relates to an electronic apparatus which provides a completion text as a recommended search term associated with an input letter for content that is currently displayed.

2. Description of Related Art

Text searches often use a prediction function that predicts a search term based on currently inputted one or more terms. An example prediction function is an automatic completing function that predicts one or more search terms based on the currently inputted one or more terms. Automatic completing functions of search terms provided through various electronic apparatuses of the related art rely on methods such as recommending a most popular entity from among entities stored in a server or the like through a network.

However, when relying on an external server or network as discussed above, there have been many cases of words being recommended as search terms that are unrelated with content (e.g., web page content, image content, video content, audio content, etc.) currently viewed by a user. In most cases, relying on conventional technologies, recommended search terms that fail to reflect a current situation of the user have been selected and provided.

SUMMARY

Provided are an electronic apparatus which outputs, based on at least one letter for a search being input from a user while content is displayed, a completion text that includes the input letter and is associated with the corresponding content as a recommended search term and a control method thereof.

Further, provided is a system which provides a content-based search term recommending service in addition to a search engine service.

According to an aspect of the disclosure, an electronic apparatus includes: a display; and a processor connected with the display, and configured to control the display, where the processor is configured to: control the display to display content, obtain a text corpus associated with the displayed content, obtain, based on a letter for a search being input while the content is displayed and based on the obtained text corpus, at least one completion text which comprises the input letter, and control the display to display the obtained completion text as a recommended search term.

The processor may be further configured to identify, from among the plurality of texts, a first text and a second text which correspond to the preset first part of speech and include the input letter, obtain a first completion text which comprises the identified first text and a second completion text which comprises the identified second text, and control the display to display the obtained first completion text and the second completion text as recommended search terms.

The processor may be further configured to generate, based on the text corpus stored in the electronic apparatus and associated with the displayed content, the at least one completion text based on the stored text corpus.

The processor may be further configured to obtain at least one image by capturing the displayed content, obtain the text corpus by extracting at least one text comprised in the obtained image, and obtain, based on the obtained text corpus, the at least one completion text.

The electronic apparatus may further include a communicator configured to perform communication with a server device, where the processor is further configured to: transmit, to the server device through the communicator, a signal requesting metadata of the content, obtain, based on metadata of the content being received from the server device through the communicator, the text corpus comprised in the received metadata, and obtain the at least one completion text based on the obtained text corpus.

According to an aspect of the disclosure, a control method of an electronic apparatus includes displaying content on a display of the electronic apparatus; obtaining a text corpus associated with the displayed content; obtaining, based on a letter for a search being input while the content is displayed and based on the obtained text corpus, at least one completion text which comprises the input letter; and displaying the obtained completion text as a recommended search term.

The obtaining the at least one completion text may include: tagging a part of speech corresponding to each text for each of a plurality of texts included in the text corpus, identifying, from among the plurality of texts included in the text corpus, a text which corresponds to a preset first part of speech and begins with the input letter, and obtaining the completion text which comprises the identified text.

The obtaining at least one completion text may include: identifying, from among the plurality of texts, at least another text following the identified text and occurring before a text corresponding to a preset second part of speech, and obtaining the completion text which comprises the identified text and the at least another text following the identified text.

The obtaining at least one completion text may include: identifying, from among the plurality of texts, at least another text following the identified text and occurring before a preset symbol, and obtaining the completion text which comprises the identified text and the at least another text following the identified text.

The obtaining the at least one completion text may include: obtaining, from among the plurality of texts, the completion text which comprises texts of a preset number starting with the identified text.

The obtaining the at least one completion text may include: obtaining, based on a text corresponding to a preset second part of speech being present in the texts of the preset number starting with the identified text, the completion text which comprises at least another text that occurs before the text corresponding to the present second part of speech.

The obtaining the at least one completion text may include: identifying, from among the plurality of texts, a first text and a second text which correspond to the preset first part of speech and include the input letter, obtaining a first completion text which comprises the identified first text and a second completion text which comprises the identified second text, and displaying the obtained first completion text and the second completion text as recommended search terms.

The obtaining the at least one completion text may include: generating, based on the text corpus stored in the electronic apparatus and associated with the displayed content, the at least one completion text based on the stored text corpus.

The obtaining the at least one completion text may include: obtaining at least one image by capturing the displayed content, obtaining the text corpus by extracting at least one text comprised in the obtained image, and obtaining, based on the obtained text corpus, the at least one completion text.

The method may further include transmitting, to a server device, a signal requesting metadata of the content, obtaining, based on metadata of the content being received from the server device, the text corpus comprised in the received metadata, and obtaining the at least one completion text based on the obtained text corpus.

The electronic apparatus and the control method thereof according to the disclosure may have an effect of being able to provide a user customized recommended search term reflecting not only a letter input by a user, but also content that the user is currently viewing.

Based on there being many cases of information included in a content that is currently displayed causing the user to perform a search, there is a high likelihood of a recommended search term that is provided by the electronic apparatus and the control method according to the disclosure corresponding to a search term desired by the user.

Specifically, in terms of electronic apparatuses such as a TV which are inconvenient for inputting letters (e.g., in case a remote controller with only number buttons is used), user convenience may be greatly enhanced if a number of letters input by the user may be reduced even once by providing the recommended search term which is appropriate to a user situation (e.g., content being watched by the user).

BRIEF DESCRIPTION OF DRAWINGS

Other aspects, features and benefits of specific preferred embodiments of the disclosure as described above will become more apparent from the following description taken in conjunction with the accompanying drawings.

FIG. 4A to FIG. 4D are diagrams illustrating an operation of an electronic apparatus tagging a part of speech in a plurality of texts within a text corpus associated with content, and identifying a text corresponding to a preset part of speech, according to various embodiments of the disclosure;

FIG. 6 is a diagram illustrating an operation of an electronic apparatus identifying a text which includes an input letter and corresponds to a preset part of speech, according to an embodiment of the disclosure;

FIG. 9 is a block diagram illustrating a detailed configuration of an electronic apparatus, according to various embodiments of the disclosure;

DETAILED DESCRIPTION

Figure 1A:
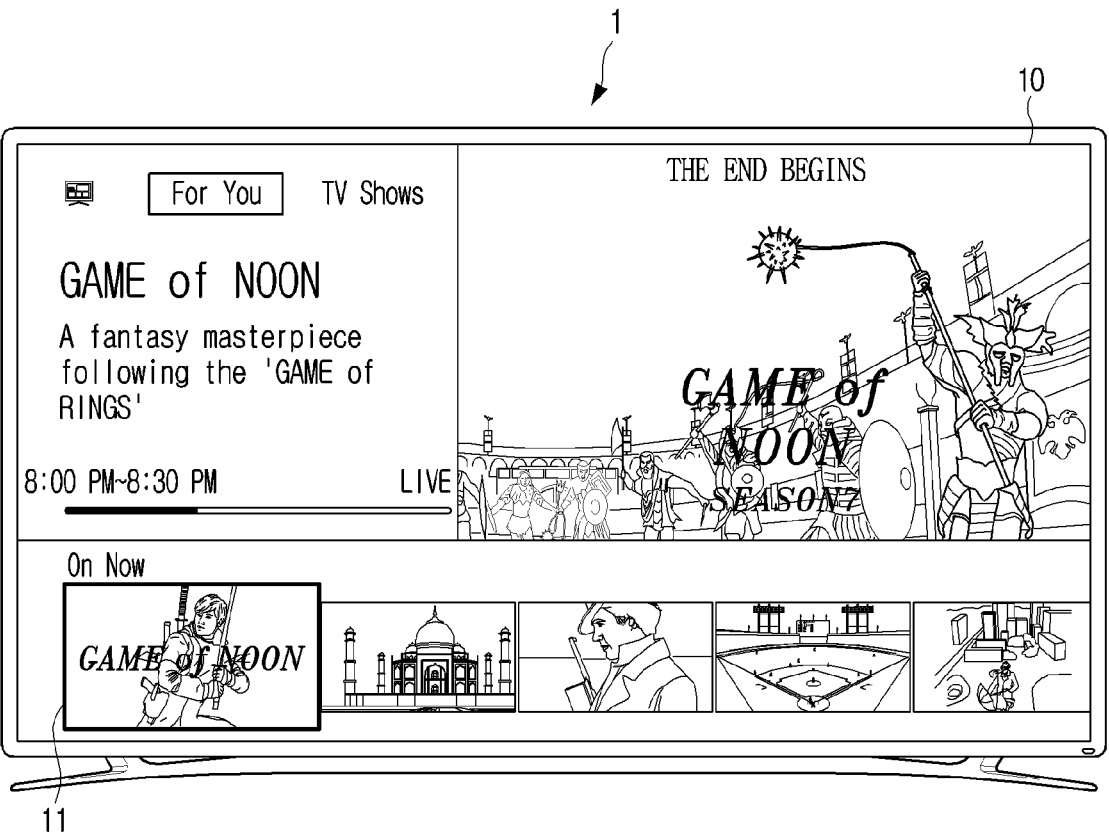
FIG. 1A and FIG. 1B are diagrams schematically illustrating an operation of an electronic apparatus, according to an embodiment of the disclosure.

Before describing the disclosure in detail, a description method of the disclosure and the drawings will be described.

First, terms used in describing the various embodiments of the disclosure are general terms selected considering their function herein. However, the terms may change depending on intention, legal or technical interpretation, emergence of new technologies, and the like of those skilled in the related art. Further, in certain cases, there may be terms arbitrarily selected. In this case, the meaning of the term may be interpreted as defined in the description, and if there is no specific definition of the term, the meaning of the term may be interpreted based on the overall context of the disclosure and the technical common sense according to the related art.

In addition, like reference numerals or symbols shown in each accompanied drawing indicate components or elements that perform substantially the same function throughout the specification. For convenience of descriptions and understanding, the same reference numerals or symbols may be used and described in different embodiments. For example, although elements having the same reference numerals are all shown in a plurality of drawings, the plurality of drawings may refer to various embodiments.

In addition, in the embodiments of the disclosure, terms including ordinal numbers such as "first" and "second" may be used to distinguish between elements. The ordinal numbers may be used to distinguish same or like elements from one another and a meaning the term is not limited by the use of the ordinal numbers. In an example, an element combined with an ordinal number should not be limited in an order of use, order of arrangement, and the like by the ordinal number. In some examples, each ordinal number may be used inter-changeably.

In the disclosure, a singular expression includes a plural expression, unless otherwise specified. It is to be understood that the terms such as "consist" or "include" are used herein to designate a presence of a characteristic, number, step, operation, element, component, or a combination thereof described in the disclosure, and not to preclude a presence or a possibility of adding one or more of other characteristics, numbers, steps, operations, elements, components or a combination thereof.

In the embodiments of the disclosure, terms such as "module", "unit", or "part" may be terms for designating an element performing at least one function or operation, and the elements may be implemented with a hardware or software, or a combination of hardware and software. In addition, a plurality of "modules", a plurality of "units", or a plurality of "parts", except for when each thereof needs to be implemented to a separate specific hardware, may be integrated to at least one module or chip and implemented in at least one processor.

In addition, in the embodiments of the disclosure, when a certain part is described as connected to another part, this includes not only a direction connection, but also an indirect connection through another medium. In addition, a meaning of a certain part including a certain element may mean that another element may be further included rather than excluding the another element unless otherwise specified.

Figure 1B:
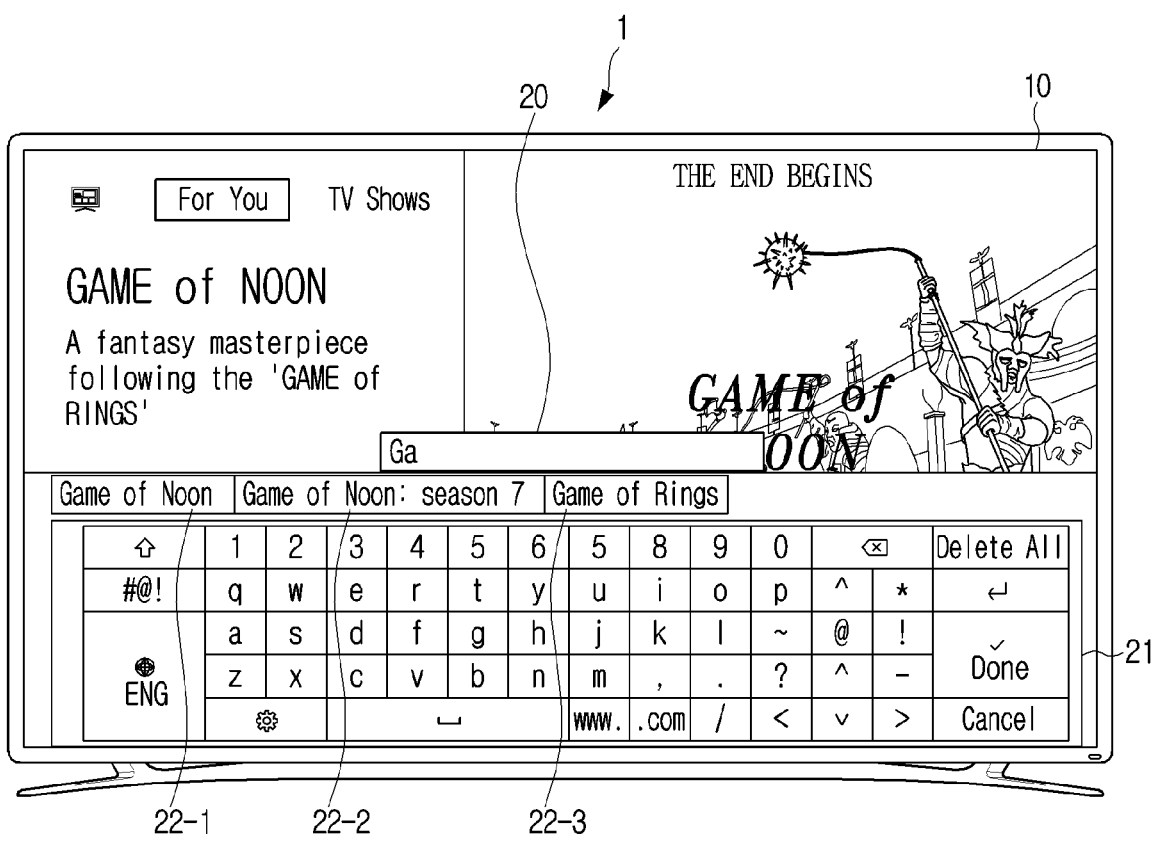

FIG. 1A and FIG. 1B are diagrams schematically illustrating an operation of an electronic apparatus, according to an embodiment of the disclosure. Referring to FIG. 1A, an electronic apparatus 1, implemented as a television (TV) as an example, may display a specific web page 10.

Referring to FIG. 1A, the web page 10 may be a web page for providing a movie titled 'GAME of NOON', and a user may view 'GAME of NOON' by selecting at least one item (e.g., item 11) on the web page. The item 11 may be displayed in a menu of web page 10 providing one or more options for selection. On the web page 10, the title of the content 'GAME of NOON' along with a brief description on the content (e.g., A fantasy masterpiece following the 'GAME of RINGS') may be display upon selection of item 11.

In FIG. 1A, a user command of requesting a search window may be received, which may result in the display of a search window 20, as illustrated in FIG. 1B.

Furthermore, referring to FIG. 1B, the electronic apparatus 1 may display a keyboard user interface (UI) 21 for inputting one or more letters in the search window 20 while the search window 20 is displayed.

Referring to FIG. 1B, based on 'G' and 'a' being sequentially input through the keyboard UI 21, the electronic apparatus 1 may provide a recommended search term beginning with 'Ga.'.

For example, referring to FIG. 1B, the electronic apparatus 1 may display completion texts (e.g., 'Game of Noon' 22-1, 'Game of Noon: season 7' 22-2, 'Game of Rings' 22-3) which begin with 'Ga.' and are associated with the web page 10 that is currently being provided as the recommended search term.

As described above, the electronic apparatus, according to embodiments of the disclosure may suggest a recommended search term which includes a letter input by the user and is associated with the currently displayed content. Through the drawings below, an example configuration and operation of the electronic apparatus providing the recommended search term will be described with more detailed embodiments.

Figure 2:
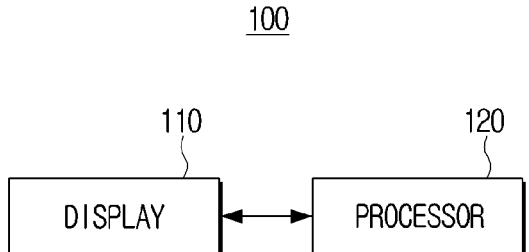
FIG. 2 is a block diagram illustrating a configuration of an electronic apparatus, according to an embodiment of the disclosure.

FIG. 2 is a block diagram illustrating a configuration of an electronic apparatus according to an embodiment of the disclosure. Referring to FIG. 2, an electronic apparatus 100 may include a display 110 and a processor 120.

The electronic apparatus 100 may be implemented as part of various terminal devices such as, for example, and without limitation, a TV, a notebook personal computer (PC), a tablet PC, a smartphone, but is not limited thereto, and may be implemented as part of any electronic apparatus known to one of ordinary skill in the art. The electronic apparatus 100 may also be implemented as a set top box, a desktop PC, or any other electronic apparatus known to one of ordinary skill in the art, which does not include the display 110. For example, the electronic apparatus 100 may be connected with an external display device such as a TV, which includes a display or a monitor, and control the external display device.

The display 110 may be configured to display various content or various user interfaces that are provided through the electronic apparatus 100. The display 110 may be implemented as a liquid crystal display (LCD), a plasma display panel (PDP), an organic light emitting diodes (OLED), a transparent OLED (TOLED), or any other display type known to one of ordinary skill in the art.

The display 110 may include a touch screen form which may detect a touch operation of the user. The display 110 may be implemented as a flexible display, which may be folded or bent.

The processor 120 may be configured to connect with each component within the electronic apparatus 100 and control the overall operation of the electronic apparatus 100. For example, the processor 120 may include a random access memory (RAM), a read only memory (ROM), a central processing unit (CPU), a graphic processing unit (GPU), a system BUS, or any other processor component known to one of ordinary skill in the art, and execute calculations or data processing associated with controlling other elements included in the electronic apparatus 100.

The processor 120 may control the display 110 to display content. For example, content may correspond to various contents such as a web page, a video content, an audio content, an image, a game, or any other type of content type known to one of ordinary skill in the art. The content may be content that is pre-stored in the electronic apparatus 100, or content that is received from an external electronic apparatus (e.g., set top box, server device, console device, etc.).

The processor 120 may provide a user interface (UI) for searching. For example, the processor 120 may control the display 110 to display the search window 20 as illustrated in FIG. 1B described above.

Figure 3A:
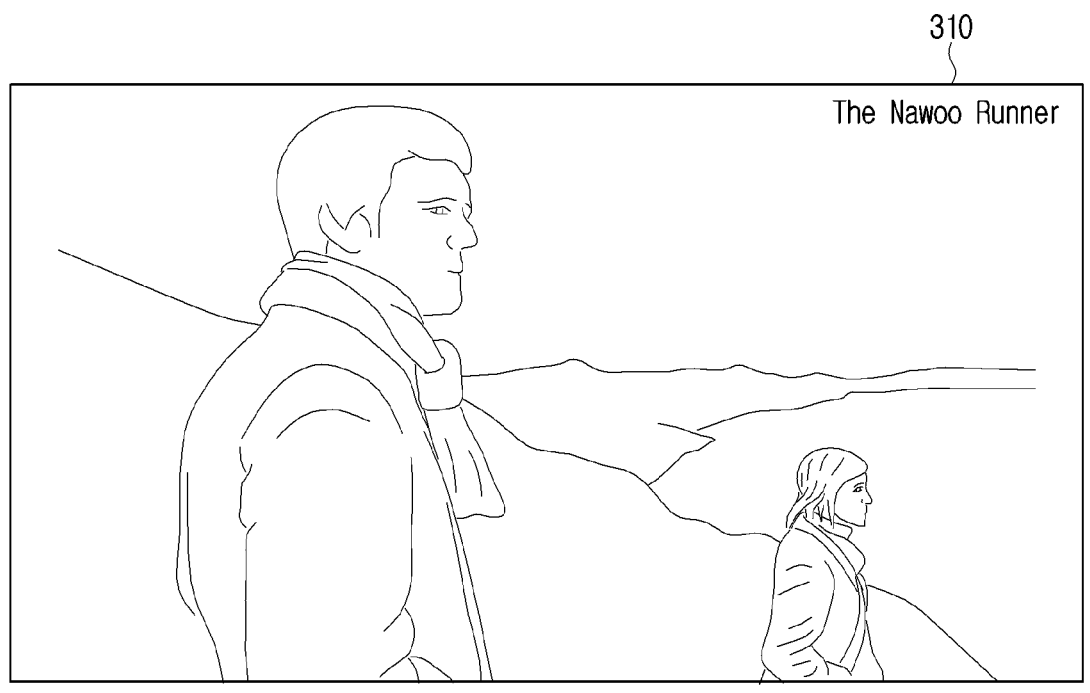
FIG. 3A to FIG. 3B are diagrams illustrating an example of an electronic apparatus for providing a search window while providing content, according to an embodiment of the disclosure.
Figure 3B:
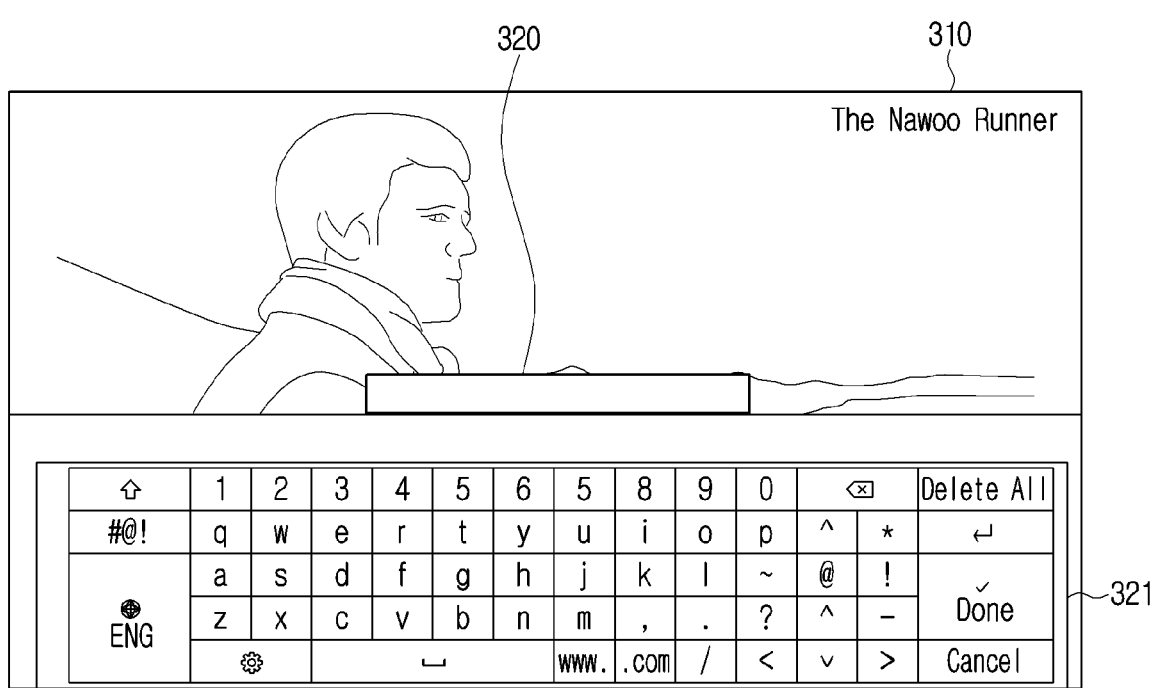

FIG. 3A and FIG. 3B are diagrams illustrating an example of an electronic apparatus of the disclosure providing a UI for searching while the content is provided to a display, according to an embodiment of the disclosure.

In FIG. 3A, the electronic apparatus 100 is playing back a video content 310 titled 'The Nawoo Runner' is shown.

During playback of the video content 310, referring to FIG. 3B, based on reception of a user command requesting the UI for searching, the electronic apparatus 100 may display a search window 320 and a keyboard UI 321. For example, the user command may be directly input to the electronic apparatus 100 through various methods such as, for example, and without limitation, a button operation, a touch, a voice, or any other input method known to one of ordinary skill in the art. The user command may also be received through an external control device such as, for example, and without limitation, a remote controller, a mouse, or any other external control device known to one of ordinary skill in the art.

However, in some examples, the search window 320 may be displayed without the keyboard UI 321.

As described above, a position or size of a screen on which the 'UI for searching' is displayed, which is implemented to include the search window and/or the keyboard UI, may be designed within a scope that is easily modifiable from a level of one of ordinary skill in the art.

In some examples, a search window may already be included in the content itself that is being displayed. For example, if the electronic apparatus 100 is displaying a web page (e.g., content), which provides a search engine service, the processor 120 may not provide a new search window or a UI for searching while in a state in which the web page, which already includes the search window, is being displayed.

When the UIs for searching 320 and 321 are displayed, the electronic apparatus 100 may continuously playback or temporarily stop the video content 310.

When the UIs for searching 320 and 321 are displayed, at least one letter for searching in the search window 320 may be input through the keyboard UI 321. For example, when a user command for searching a search term consisting of at least one letter input in the search window is received, the processor 120 may perform a search based on pre-stored information in the electronic apparatus 100, or perform a search through an external server device. After the search, the processor 120 may control the display 110 to display obtained information (e.g., search result) according to the search.

The processor 120, according to some embodiments of the disclosure, may obtain, based on at least one letter being input in a search window while content is displayed, at least one completion text which includes the input letter. The completion text may be based on a text corpus associated with the provided content. For example, the completion text may be defined as a text which may become a 'completed search term,' and include at least one completed word or phrase.

As an example, the processor 120 may first obtain a text corpus associated with a content being displayed.

As understood by one of ordinary skill in the art, a text corpus may be a language resource that includes a large structured set of texts. For example, the text corpus may include a set of texts including at least one text.

A text corpus for a content may include a set of various texts associated with the content. For example, a text corpus for a content may include various texts that are prepared and distributed in association with the content such as, for example, and without limitation, a text for describing the content, a text for promoting the content, a text for rating the content, a search result text of the content, words representing various entities (place, character, time, etc.) associated with the content, or any other relevant text known to one of ordinary skill in the art.

A text corpus for a content may be obtained through various methods disclosed in further detail below.

When the text corpus associated with the displayed content is stored in a memory of the electronic apparatus 100, the processor 120 may simply obtain the text corpus by loading the text corpus stored in the memory.

For example, based on content and a text corpus associated with the content being stored in the memory of the electronic apparatus 100, the processor 120 may obtain the stored text corpus while the corresponding content is displayed (e.g., displayed on electronic apparatus).

For example, if the electronic apparatus 100 connects to a web page through a web address provided by an external server device, the electronic apparatus 100 may receive information on a text appearing in the web page through the web address. For example, because information on the text maybe stored in the memory of the electronic apparatus 100 at least while the electronic apparatus 100 is connected to the web page via the web address, the processor 120 may obtain at least one text included in the information on the text as the text corpus.

In some embodiments, the processor 120 may obtain at least one image by capturing displayed content, and obtain the text corpus by extracting at least one text included in the obtained image. When the image is obtained, the processor 120 may extract the text from the image using various techniques known to one of ordinary skill in the art such as an optical character recognition (OCR).

In some embodiments, the processor 120 may transmit a signal requesting metadata of a content to an external server device, and when metadata of the content is received from the server device, obtain the text corpus included in the received metadata.

The processor 120 may obtain the text corpus for the corresponding content while the content is being displayed in display 110, for example, on the electronic apparatus 100.

In some embodiments, regardless of whether the content is displayed, the processor 120 may obtain the text corpus for a content pre-stored in the memory of the electronic apparatus 100.

In some embodiments, the processor 120 may obtain, based on the user command of requesting the UI for searching being input while the content is displayed on the electronic apparatus 100, the text corpus associated with the corresponding content.

Through FIG. 4A to FIG. 4D, a process of obtaining a completion text using an obtained text corpus will be described in further detail below.

After the text corpus is obtained, the processor 120 may tag each text included in the obtained text corpus corresponding to a part of speech. The reference to a part of speech may correspond to a category to which a word is assigned in accordance with its syntactic function. Examples of parts of speech include, but are not limited to, nouns, pronouns, adjectives, determiners, verb, adverb, preposition, conjunction, and interjection.

FIG. 4A shows a text corpus 410 according to an embodiment of the disclosure. The text corpus 410 may be a text corpus associated with the video content 310 displayed on an electronic apparatus, as illustrated in FIG. 3A and FIG. 3B.

FIG. 4B shows an example of part of speech tag information 450 that is used to tag a part of speech, and part of speech information. The part of speech tag information 450 may be sourced from the Penn Treebank database, for example. The tags defined in the part of speech tag information 450 in FIG. 4B are merely exemplary, and may be defined with various methods known to one of ordinary skill in the art.

A type of the 'part of speech' used by the electronic apparatus 100 of the disclosure may further include, in some examples, a part of speech of a newly defined type in addition to the part of speeches that are widely used linguistically. For example, referring to FIG. 4B, 'SYM' meaning symbol may also be technically defined, in some examples, as corresponding to a specific part of speech.

Referring to FIG. 4C, the processor 120 may sort a plurality of texts included in the text corpus 410 associated with the video content 310, and tag the part of speech in each of the plurality of texts according to the part of speech tag information 450.

In some examples, the processor 120 may sort the text corpus into a plurality of texts (e.g., word segment) based on word spacing (gaps) and/or symbols and subsequently, tag the part of speech for each text by analyzing each sorted text (e.g., morpheme analysis).

Accordingly, 'The' 411 may be tagged as 'DT' 411-1 corresponding to a determiner, and 'Nawoo' 412 may be tagged as 'NNP' 412-1 corresponding to a proper noun. Furthermore, at least one part of speech may be tagged for other texts included in the text corpus 410.

Further, the processor 120 may identify a text corresponding to a preset first part of speech from among the plurality of texts. For example, the preset first part of speech may correspond to a part of speech, which may be a first beginning word of a completion text that may be the search term. For example, the preset first part of speech may be defined to include a noun, an adjective, and an adverb, but is not limited thereto.

Referring to FIG. 4D, the processor 120 may define, from among the plurality of texts respectively tagged with the part of speech, the texts corresponding to the preset first part of speech as 'True', and other remaining texts as 'False'. For example, in the case of the text 'Nawoo' 412 defined as 'True' 412-2, the text may become a primary word of a completion text, whereas in the case of the text 'The' 411 defined as 'False' 411-2, the text may not become the primary word of the completion text.

The operations described above in FIG. 4A to FIG. 4D may be performed while the video content 310 is being displayed as shown in FIG. 3A. In further examples, the operations described above in FIG. 4A to FIG. 4D may be performed according to a user command being input for requesting the UI for searching as shown in FIG. 3B. In further examples, the operations described above in FIG. 4A to FIG. 4D may be performed according to at least one letter for a search being input as shown in FIG. 5, which will be described in further below.

The processor 120 may identify, based on at least one letter for a search being input while a content is displayed (e.g., through the UI for searching, etc.), a text, which begins with the input having at least one letter and corresponds to the preset first part of speech. For example, the processor 120 may determine the identified text as a start text.

Figure 5:
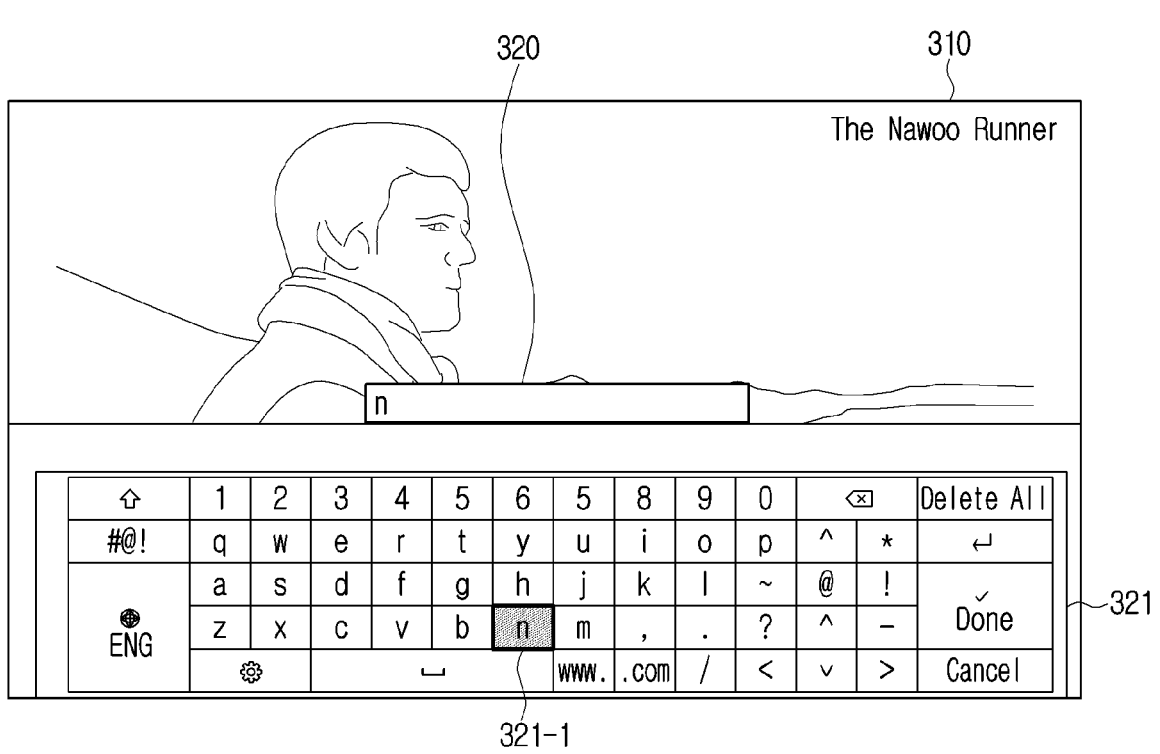
FIG. 5 is a diagram illustrating an example of an electronic apparatus of the disclosure receiving input of at least one letter for a search through a UI for searching, according to an embodiment of the disclosure.

FIG. 5 shows, in some examples, the letter 'n' 321-1 being input through the UIs for searching 320 and 321 provided while the video content 310 is displayed.

In this case, the processor 120 may identify the text beginning with the input letter 'n' and corresponding to the preset first part of speech (e.g., True) in a tagged text corpus 410".

Referring to FIG. 6, the processor 120 may identify the texts ('Nawoo' 412, 'Nawoo' 422, 'Nawoo' 432) which begin with 'n' and correspond to a '(proper) noun' (e.g., included in the preset first part of speech).

Furthermore, the processor 120 may obtain the completion text including the identified text. For example, the processor 120 may obtain the completion text beginning with the identified text.

Figure 7A:
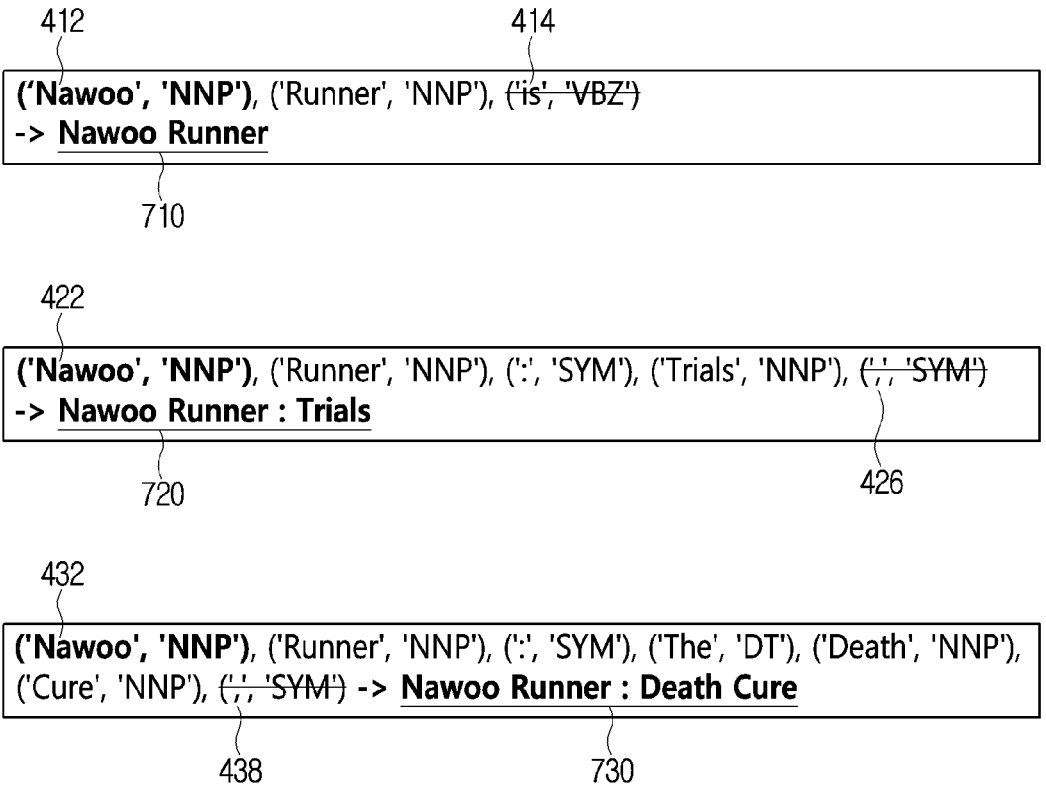
FIG. 7A to FIG. 7B are diagrams illustrating various examples of an electronic apparatus obtaining a completion text based on an identified text, according to an embodiment of the disclosure.
Figure 7B:
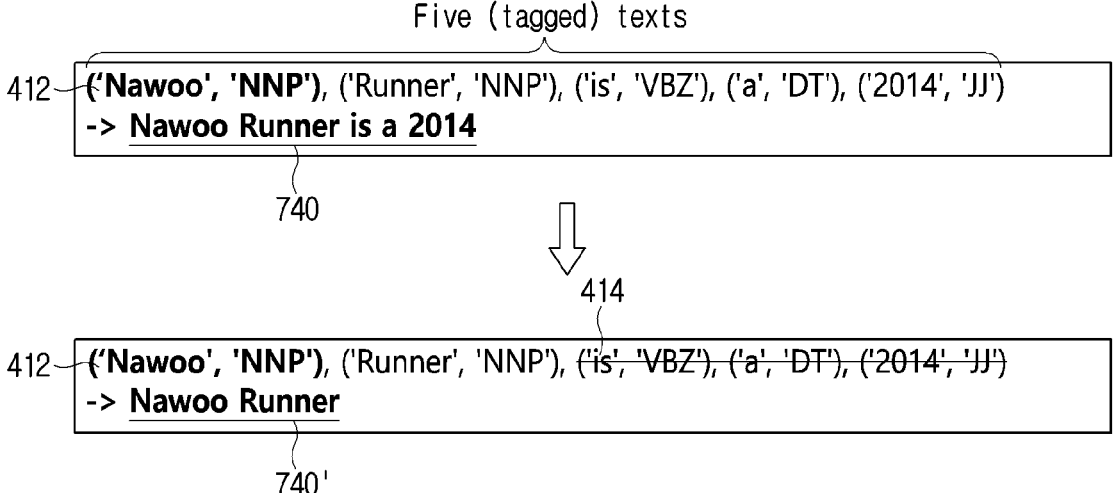

FIG. 7A and FIG. 7B are diagrams illustrating various examples of an electronic apparatus of the disclosure obtaining a completion text based on an identified text.

The processor 120 may identify, from among the plurality of texts tagged with the part of speech included in the text corpus, at least another text following the identified text and occurring before a text corresponding to a preset second part of speech. Subsequently, the processor 120 may obtain a completion text that may include the identified text and at least another text following the identified text.

In some examples, the preset second part of speech may be a part of speech defined as not included in the search term. For example, the preset second part of speech may include a 'verb', but is not limited thereto.

In further examples, the processor 120 may identify, from among the plurality of texts tagged with the part of speech included in the text corpus, at least another text following the identified text and occurring before a preset symbol. Subsequently, the processor 120 may obtain a completion text that may include the identified text and the at least another text following the identified text.

In some examples, the preset symbol may be a symbol defined as not included in the search term. For example, the preset symbol may include '.' (full stop), ',' (comma), and the like, but is not limited thereto. In some examples, symbols such as ':' (colon) and '-' (hyphen) may be defined as not included in the preset symbol.

FIG. 7A relates to an embodiment of a processor 120 obtaining a completion text using texts which begin with the identified text until before a text corresponding to the preset symbol or the preset first part of speech appears.

Referring to FIG. 7A, the processor 120 may identify, among the plurality of texts from the text corpus 410, texts (e.g., 'Nawoo', 'Runner', 'is', . . . ) starting with the identified text 'Nawoo' 412.

In some examples, the processor 120 may obtain the completion text 'Nawoo Runner' 710 which includes texts that begin with 'Nawoo' 412 and at least another text (e.g., Runner) that occurs before the text 'is' 414, which is a text corresponding to a 'verb'.

Referring to FIG. 7A, the processor 120 may identify, among the plurality of texts from the text corpus 410, texts (e.g., 'Nawoo', 'Runner', ':', 'Trials', ',', . . . ) starting with the identified text 'Nawoo' 422.

In some examples, the processor 120 may obtain the completion text 'Nawoo Runner: Trials' 720, which includes texts that begin with 'Nawoo' 422 and at least another text (e.g., Trials) that occurs before the preset symbol ',' 426.

Referring to FIG. 7A, the processor 120 may identify, among the plurality of texts from the text corpus 410, texts (e.g., 'Nawoo', 'Runner', ':', 'Death', 'Cure',',', . . . ) starting with the identified text 'Nawoo' 432.

In some examples, the processor 120 may obtain the completion text 'Nawoo Runner: Death Cure' 730, which includes the texts beginning with 'Nawoo' 432 and at least another text that occurs before the preset symbol ',' 438.

The processor 120 may obtain, from among the plurality of texts tagged with the part of speech included in the text corpus, the completion text which includes texts of a preset number starting with the identified text.

However, the processor 120 may obtain, based on a text corresponding to the preset second part of speech being present in the texts of the preset number starting with the identified text, a completion text that includes the identified text and at least another text occurring before the text corresponding to the preset second part of speech from among the texts of the preset number.

In this respect, FIG. 7B relates to an embodiment of the processor 120 obtaining a completion text using texts of a preset number starting with the identified text.

Referring to FIG. 7B, the processor 120 may obtain, from the text corpus 410, the completion text 'Nawoo Runner is a 2014' 740, which includes a preset number of five texts (e.g., 'Nawoo', 'Runner', 'is', 'a', '2014') starting with the identified text 'Nawoo' 412.

In further examples, the processor 120 may obtain, from among the above-described preset five texts, a completion text 'Nawoo Runner' 740, which includes the identified text (e.g., 'Nawoo'), and at least another text (e.g., 'Runner') occurs before the text 'is' 414 that corresponds to the preset second part of speech.

In some examples, the processor 120 may obtain, from the text corpus, the completion text through various methods using at least one text that follows, starting from the text identified as the start text, on the text corpus.

In some embodiments, the processor 120 may provide the obtained completion text as a recommended search term. For example, the processor 120 may control the display 110 to display the completion text.

Figure 8:
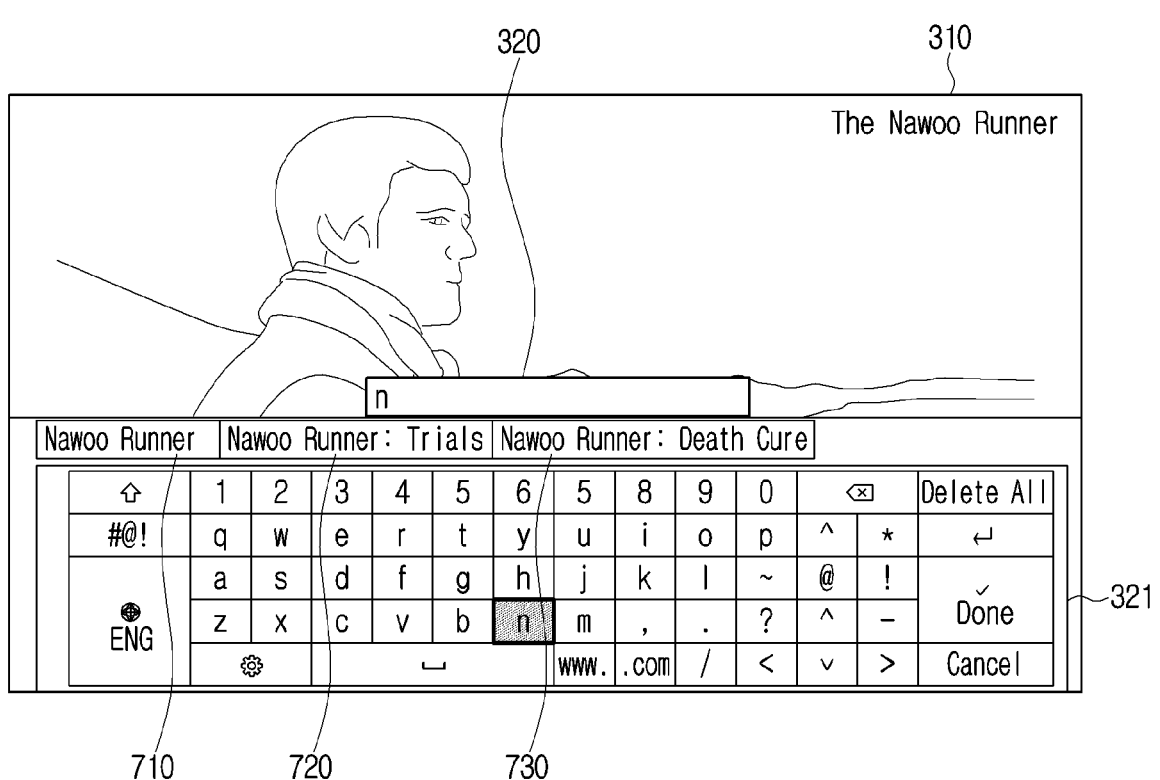
FIG. 8 is a diagram illustrating an operation of an electronic apparatus providing a completion text as a recommended search term, according to an embodiment of the disclosure.

FIG. 8 is a diagram illustrating an operation of an electronic apparatus providing a completed text as a recommended search term, according to an embodiment of the disclosure.

As illustrated in FIG. 8, the electronic apparatus 100 may provide, as the recommended search terms, completion texts 710, 720, and 730 obtained with the method of FIG. 7A from each of the texts 412, 422, and 432.

For example, based on a user command of selecting one from among the provided completion texts being received, the processor 120 may perform a search of the selected completion text. Specifically, when a user command for performing a search of the selected completion text is input, the processor 120 may perform a search based on pre-stored information in the electronic apparatus 100 or perform a search through an external server device. Subsequently, the processor 120 may control the display 110 to display the obtained information according to the search.

However, if one from among the completion texts is not selected, and at least one letter is additionally input for the search, the processor 120 may obtain updated completion texts that may include the letter added to the at least one letter that was previously input through the same process as the above-described processes (e.g., FIG. 6, FIG. 7A, FIG. 7B) and provide the completion texts again.

In some embodiments, the above-described preset first part of speech, preset second part of speech, preset symbol, or any other part of speech may be stored in the electronic apparatus 100 and pre-defined in an implementation process of a program (e.g., application) to be used. These parts of speech may be updated according to a user command input to the electronic apparatus 100 or a control command of an external server device, which provides an application.

Figure 9:
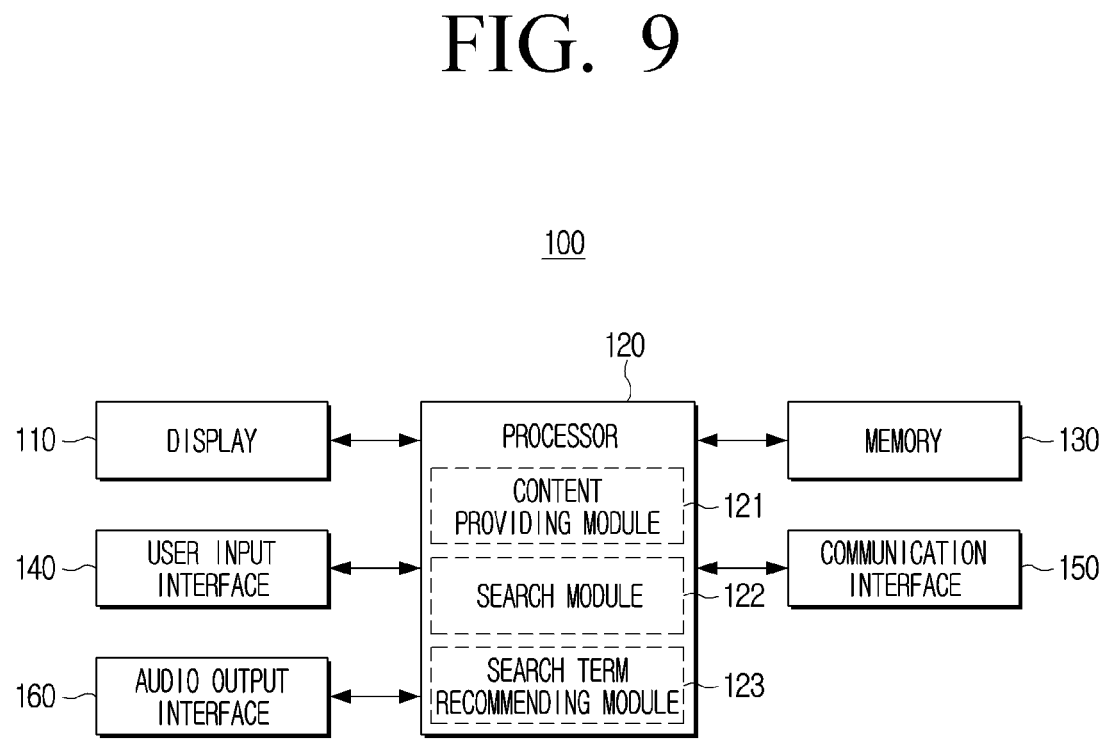

FIG. 9 is a block diagram illustrating a detailed configuration of an electronic apparatus, according to various embodiments of the disclosure.

Referring to FIG. 9, the processor 120 may control various modules such as, for example, and without limitation, a content providing module 121, a search module 122, a search term recommending module 123, or any other module known to one of ordinary skill in the art for recommending searches. Each of the modules may be implemented with software, implemented with hardware, or implemented with a combination of software and hardware.

The content providing module 121 may be a module for providing at least one content, and may provide content through the display 110, an audio output interface 160 which will be described below, and the like.

The search module 122 may provide the UI for searching (search window, keyboard UI, etc.) through the display 110, or any other display apparatus, and perform a search of the input search term. When the UI for searching is provided, the search module 122 may perform a search within the memory 130. The search module 122 may also perform a search using an external server device connected through the communication interface 150.

The search term recommending module 123 may be a module configured to obtain, as in the above-described embodiments, a completion text that may include at least one letter input for a search, and provide the obtained completion text as a recommended search term.

The configurations and respective functions of the above-described modules are merely exemplary, and may be implemented in various methods using hardware and software.

Referring to FIG. 9, the electronic apparatus 100, according to embodiments of the disclosure, may further include a memory 130, a user input interface 140, a communication interface 150, an audio output interface 160, or any other interface known to one of ordinary skill in the art, in addition to the display 110 and the processor 120.

The memory 130 may be configured to store an operating system (OS) for controlling the overall operation of the elements of the electronic apparatus 100 and instructions or data associated with the elements of the electronic apparatus 100.

For example, the memory 130 may be implemented as a non-volatile memory (e.g., hard disk, solid state drive (SSD), flash memory), a volatile memory, or any other memory known to one of ordinary skill in the art.

The memory 130 may be stored with not only various content, but also a text corpus for each of the various content. Furthermore, the memory 130 may also be stored with part of speech tagging information on the stored text corpus together therewith.

The user input interface 140 may be configured to receive various user commands. For example, a user command of requesting a UI for searching, a user command of inputting at least one letter for a search, a user command for performing a search of a search term consisting of the input letters, a user command of selecting a recommended search term, and the like may be input to the electronic apparatus 100 through the user input interface 140.

The user input interface 140 may receive a user command through various methods such as, for example, and without limitation, a touch, a button operation, a motion, voice, or any other input mechanisms known to one of ordinary skill in the art. For example, the user input interface 140 may be implemented as a touch screen, a button, a camera, a microphone, and the like included in the display 110.

The communication interface 150 may be configured to perform communication with at least one external electronic apparatus and may include circuitry.

The communication interface 150 may transmit and receive various information with at least one external electronic apparatus using communication protocols such as, for example, and without limitation, Transmission Control Protocol/Internet Protocol (TCP/IP), User Datagram Protocol (UDP), Hyper Text Transfer Protocol (HTTP), Secure Hyper Text Transfer Protocol (HTTPS), File Transfer Protocol (FTP), Secure File Transfer Protocol (SFTP), Message Queuing Telemetry Transport (MQTT), or any other communication protocol known to one of ordinary skill in the art.

For example, the communication interface 150 may be connected with an external electronic apparatus based on a network implemented through wired communication and/or wireless communication. The communication interface 150 may be directly connected with the external electronic apparatus, but may be connected with the external electronic apparatus through at least one external server (e.g., Internet Service Provider (ISP)) providing a network.

The network may be a personal area network (PAN), a local area network (LAN), a wide area network (WAN), or any other network known to one of ordinary skill in the art, according to an area or scale. For example the network may be an Intranet, an Extranet, an Internet, or any other network type known to one of ordinary skill in the art, according to a public availability of the network.

The wireless communication may include at least one from among communication methods such as, for example, and without limitation, long-term evolution (LTE), LTE Advance (LTE-A), 5th Generation (5G) mobile communication, code division multiple access (CDMA), wideband CDMA (WCDMA), universal mobile telecommunications system (UMTS), Wireless Broadband (WiBro), Global System for Mobile Communications (GSM), Time Division Multiple Access (TDMA), Wi-Fi (WiFi), WiFi Direct, Bluetooth, near field communication (NFC), Zigbee, or any other wireless communication network known to one of ordinary skill in the art.

The wired communication may include at least one from among communication methods such as, for example, and without limitation, Ethernet, optical network, Universal Serial Bus (USB), ThunderBolt, or any other communication method known to one of ordinary skill in the art. For example, the communication interface 150 may include a network interface or a network chip according to the above-described wired and wireless communication methods. The communication method is not limited to the above-described example, and may include new communication methods according to developments in technology.

The processor 120 may receive various content by being connected with at least one external electronic apparatus (e.g., set top box, server device) through the communication interface 150.

When connected with an external server device through the communication interface 150, the processor 120 may perform a search of at least one search term through a server device.

A process of obtaining the completion text may be performed through the server device. For example, the processor 120 may receive the completion text from the server device through the communication interface 150, and control the display 110 to display the received completion text as a recommended search term. In this respect, a detailed description will be described below through FIG. 10.

If the electronic apparatus 100 is implemented as a TV, or any other electronic apparatus known to one of ordinary skill in the art, which receives signals from an external control device (e.g., remote controller), the electronic apparatus 100 may receive a user command from the external control device through the communication interface 150.

The audio output interface 160 may be configured to output various content in audio form. The audio output interface 160 may be implemented with a speaker or an earphone or headset terminal.

The electronic apparatus 100 may not only provide content in auditory form through the audio output interface 160, but also output the completion text in an audio signal.

Figure 10:
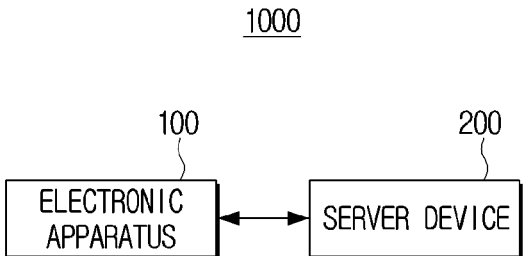
FIG. 10 is a block diagram illustrating a configuration and operation of a system implemented with an electronic apparatus and a server device, according to various embodiments of the disclosure.

FIG. 10 is a sequence diagram illustrating a configuration and operation of a system implemented with an electronic apparatus and a server device according to some embodiments of the disclosure.

Referring to FIG. 10, a system 1000 may include an electronic apparatus 100 and a server device 200. The electronic apparatus 100 may display content received from the server device 200.

According to some embodiments, the electronic apparatus 100 may transfer, based on a letter for a search being input a content is in a displayed state in the display 110, the input letter to the server device 200.

In some examples, the server device 200 may obtain at least one completion text that may include the input letter based on the text corpus associated with the displayed content. Subsequently, the server device 200 may transmit the obtained completion text to the electronic apparatus 100.

The electronic apparatus 10 may subsequently display the received completion text as a recommended search term. If a user command for searching the displayed completion text is received, the electronic apparatus 100 may transmit the request for searching the completion text to the server device 200.

The server device 200 may search, based on the request for searching the completion text being received from the electronic apparatus 100, information on the completion text, and transmit the obtained information according to the search to the electronic apparatus.

Figure 11:
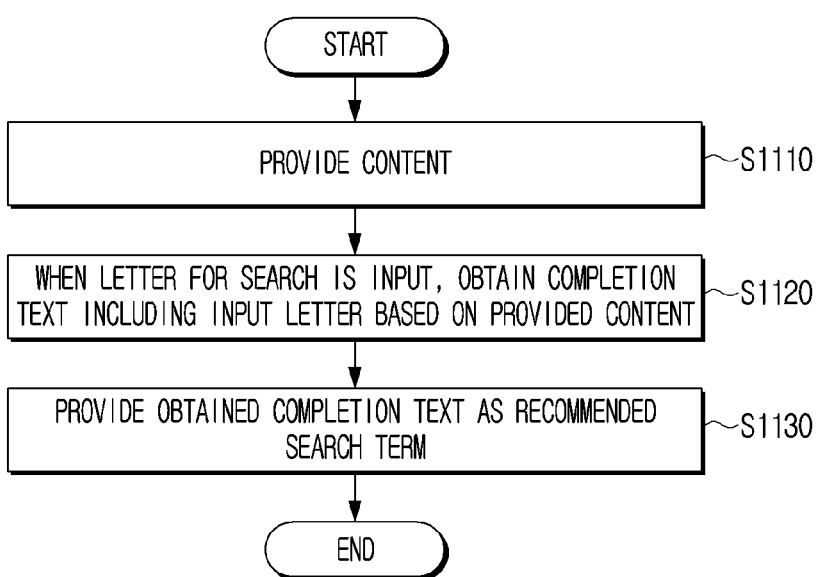
FIG. 11 is a flowchart illustrating an operation of a control method of an electronic apparatus, according to an embodiment of the disclosure.
Figure 12:
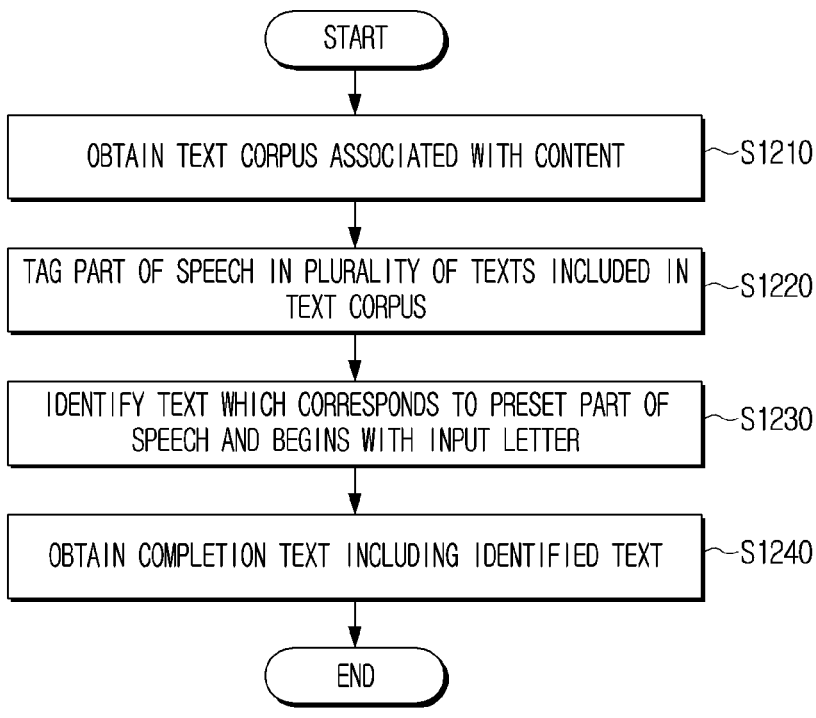
FIG. 12 is a flowchart illustrating an example of a control method of an electronic apparatus obtaining a completion text, according to an embodiment of the disclosure.

FIG. 11 and FIG. 12 illustrate control methods of an electronic apparatus, according to some embodiments of the disclosure.

FIG. 11 is a flowchart illustrating a control method of an operation of an electronic apparatus, according to an embodiment of the disclosure.

Referring to FIG. 11, the control method may include displaying content (S1110). The content may be content that is pre-stored in the electronic apparatus or content that is received from an external electronic apparatus.

When a letter for a search is input while a content is in a displayed state, at least one completion text, which includes the input letter, may be obtained based on a text corpus associated with the displayed content (S1120).

For example, a completion text, which begins with the at least one letter provided as input and is associated with the content, may be extracted from the text corpus.

The control method may include displaying the obtained completion text as a recommended search term (S1130).

If a plurality of completion texts are obtained, each of the plurality of completion texts may be displayed as a plurality of recommended search terms.

When a user command of requesting a search of the at least one recommended search term is received, the method may include performing a search of the corresponding recommended search term and providing a search result.

FIG. 12 is a flowchart illustrating in detail an example of a process (e.g., S1120) of obtaining a completion text according to a control method of an electronic apparatus, according to an embodiment of the disclosure.

Referring to FIG. 12, a text corpus associated with the first displayed content may be obtained (S1210). The obtained text corpus may be a pre-stored text corpus that is loaded to the electronic apparatus, or the text corpus may be received from an external electronic apparatus. In further examples, a displayed content may be captured and letters in the obtained image may be extracted, where a text corpus consisting of the extracted letters may be generated.

After obtaining the text corpus, part of speech corresponding to each text for each of the plurality of texts included in the text corpus may be tagged (S1220).

If at least one letter for a search is input, a text corresponding to the preset first part of speech and beginning with the letter input for the search may be identified from among the plurality of texts in the text corpus (S1230). For example, a first part of speech may correspond to a part of speech, which may be a first text of a completion text that may be the search term, and may include a verb, an adjective, a noun, or any other part of speech known to one of ordinary skill in the art.

The completion text, which includes the identified text, may be obtained (S1240). The completion text, which begins with the identified text, may be obtained.

In some examples, at least another text which follows the identified text and occurs before a text corresponding to the preset second part of speech, may be identified from among the plurality of texts in the text corpus. The completion text, which includes the identified text, and at least one text following the identified text, may be obtained.

In further examples, at least one text following the identified text, which begins with the identified text until before the preset symbol, may be identified from among the plurality of texts in the text corpus. The completion text, which includes the identified text and at least one text following the identified text may be obtained.

In further examples, the completion text, which includes texts of a preset number that follows, starting from the identified text, may be obtained from among the plurality of texts.

However, if a text corresponding to the preset second part of speech is present from among the texts of a preset number that follow starting from the identified text, a completion text, which includes at least one text before the text corresponding to the preset second part of speech, may be obtained from among the texts of a preset number. The second part of speech, which is a part of speech defined as not included in the search term, and may be defined as, for example, a 'verb' that is included in the second part of speech, may be defined through other methods.

A plurality of texts corresponding to the preset first part of speech and beginning with letters input for a search may be identified. For example, when a first text and a second text, which correspond to the preset first part of speech and include the letter input for a search, are identified, a first completion text including the identified first text and a second completion text including the identified second text may be respectively obtained.

The obtained first completion text and the second completion text may be respectively displayed as the recommended search term.

The control methods described in FIG. 11 and FIG. 12 may be performed by the electronic apparatus 100 shown and described in FIG. 2 to FIG. 9.

In further examples, the control methods described FIG. 11 and FIG. 12 may be performed through a system including the electronic apparatus 100 and at least one external electronic apparatus. The system 1000 shown and described in FIG. 10 may be an example of an electronic apparatus and at least one external electronic apparatus.

The various embodiments described above may be implemented in a computer or in a recording medium readable by a similar device using software, hardware, or a combination thereof.

Based on a hardware implementation, the embodiments described herein may be implemented using at least one from among application specific integrated circuits (ASICs), digital signal processors (DSPs), digital signal processing devices (DSPDs), programmable logic devices (PLDs), field programmable gate arrays (FPGAs), a processor, a controller, micro-controllers, a microprocessor, and an electrical unit for performing other functions.

Some embodiments described in the disclosure may be implemented by the processor 120. Based on a software implementation, some embodiments of processes and functions described in the disclosure may be implemented with separate software modules. Each of the above-described software modules may perform at least one function and operation described in the disclosure.

The computer instructions for performing processing operations in the electronic apparatus 100 according to the various embodiments described above may be stored in a non-transitory computer-readable medium. The computer instructions stored in this non-transitory computer-readable medium may cause a specific device to perform a processing operation of the electronic apparatus 100 according to the above-described various embodiments when executed by a processor of the specific device.

The non-transitory computer readable medium may refer to a medium that stores data semi-permanently rather than storing data for a very short time, such as a register, a cache, a memory, or any other memory known to one of ordinary skill in the art, and is readable by a device. Specifically, the above-described various applications or programs may be stored and provided in the non-transitory computer readable medium such as, for example, and without limitation, a compact disc (CD), a digital versatile disc (DVD), a hard disc, a Blu-ray disc, a USB, a memory card, a ROM, and the like.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic apparatus comprising:
a display; and
a processor connected with the display, and configured to control the display,
wherein the processor is configured to:
receive content from an external source,
control the display to display the content received from the external source,
obtain, during playback of the content, at least one image from the displayed content,
perform an optical character recognition process on the at least one image to obtain at least one text embedded in the at least one image,
obtain, from the external source, a text corpus including a text description associated with the at least one text,
control the display to display, based on reception of a search command, a keyboard graphical user interface (GUI) configured to receive a user input corresponding to a search, the keyboard GUI overlaid on the content during playback of the content,
obtain, based on a letter for the search being input into the keyboard GUI while the content is simultaneously displayed with the keyboard GUI and based on the obtained text corpus, at least one completion text which comprises the input letter, and
control the display to display the at least one completion text as a recommended search term, and
wherein the processor is further configured to:

tag a part of speech corresponding to each text for each of a plurality of texts included in the obtained text corpus, identify, from among the plurality of texts included in the obtained text corpus, a text which corresponds to a preset first part of speech and begins with the input letter, identify, from among the plurality of texts, at least another text following the identified text and occurring before a text corresponding to a preset second part of speech, and obtain the at least one completion text which comprises the identified text and the at least another text following the identified text.

2. The electronic apparatus of claim 1, wherein the processor is further configured to:

identify, from among the plurality of texts, at least another text following the identified text and occurring before a preset symbol, and obtain the at least one completion text which comprises the identified text and the at least another text following the identified text and occurring before the preset symbol.

3. The electronic apparatus of claim 1, wherein the processor is further configured to:

obtain, from among the plurality of texts, the at least one completion text which comprises texts of a preset number starting with the identified text.

4. The electronic apparatus of claim 3, wherein the processor is further configured to:

obtain, based on a text corresponding to a preset second part of speech being present in the texts of the preset number starting with the identified text, the at least one completion text which comprises at least another text that occurs before the text corresponding to the preset second part of speech.

5. The electronic apparatus of claim 1, wherein the processor is further configured to:

identify, from among the plurality of texts, a first text and a second text which correspond to the preset first part of speech and include the input letter, obtain a first completion text which comprises the identified first text and a second completion text which comprises the identified second text, and control the display to display the obtained first completion text and the second completion text as recommended search terms.

6. The electronic apparatus of claim 1, wherein the processor is further configured to:

generate, based on the obtained text corpus stored in the electronic apparatus and associated with the displayed content, the at least one completion text based on the stored text corpus.

7. The electronic apparatus of claim 1, wherein the external source is a server device, the electronic apparatus further comprising:

a communicator configured to perform communication with the server device, wherein the processor is further configured to:

transmit, to the server device through the communicator, a signal requesting metadata of the content, obtain, based on metadata of the content being received from the server device through the communicator, the text corpus comprised in the received metadata, and obtain the at least one completion text based on the obtained text corpus.

8. A control method of an electronic apparatus, the control method comprising:

receiving content from an external source;

displaying the content received from the external source on a display of the electronic apparatus;

obtaining, during playback of the content, at least one image from the displayed content;

performing an optical character recognition process on the at least one image to obtain at least one text embedded in the at least one image;

obtaining, from the external source, a text corpus including a text description associated with the at least one text of the displayed content;

displaying, based on reception of a search command, a keyboard graphical user interface (GUI) configured to receive a user input corresponding to a search, the keyboard GUI overlaid on the content during playback of the content;

obtaining, based on a letter for the search being input into the keyboard GUI while the content is simultaneously displayed with the keyboard GUI and based on the obtained text corpus, at least one completion text which comprises the input letter; and displaying the at least one completion text as a recommended search term, wherein the obtaining the at least one completion text comprises:

tagging a part of speech corresponding to each text for each of a plurality of texts included in the obtained text corpus, identifying, from among the plurality of texts included in the obtained text corpus, a text which corresponds to a preset first part of speech and begins with the input letter, identifying, from among the plurality of texts, at least another text following the identified text and occurring before a text corresponding to a preset second part of speech, and obtaining the at least one completion text which comprises the identified text and the at least another text following the identified text.

9. The control method of claim 8, wherein the obtaining the at least one completion text comprises:

identifying, from among the plurality of texts, at least another text following the identified text and occurring before a preset symbol, and obtaining the at least one completion text which comprises the identified text and the at least another text following the identified text and occurring before the preset symbol.

10. The control method of claim 8, wherein the obtaining the at least one completion text comprises:

obtaining, from among the plurality of texts, the at least one completion text which comprises texts of a preset number starting with the identified text.

11. The control method of claim 10, wherein the obtaining the at least one completion text comprises:

obtaining, based on a text corresponding to a preset second part of speech being present in the texts of the preset number starting with the identified text, the at least one completion text which comprises at least another text that occurs before the text corresponding to the preset second part of speech.

12. The control method of claim 8, wherein the obtaining the at least one completion text comprises:

identifying, from among the plurality of texts, a first text and a second text which correspond to the preset first part of speech and include the input letter, obtaining a first completion text which comprises the
    identified first text and a second completion text which
    comprises the identified second text, and
  displaying the obtained first completion text and the
    second completion text as recommended search terms.

13. The control method of claim 8, wherein the obtaining
the at least one completion text comprises:
  generating, based on the obtained text corpus stored in the
    electronic apparatus and associated with the displayed
    content, the at least one completion text based on the
    stored text corpus.

14. The control method of claim 8, wherein the external
source is a server device, the control method further com-
prising:
  transmitting, to the server device, a signal requesting
    metadata of the content,
  wherein the obtained text corpus comprised in the
    received metadata, and
  obtaining the at least one completion text based on the
    obtained text corpus.

* * * * *